(12) United States Patent
D'Ambrosio et al.

(10) Patent No.: US 6,471,161 B1
(45) Date of Patent: Oct. 29, 2002

(54) SATELLITE ATTITUDE CONTROL SYSTEM

(75) Inventors: Raymond Charles D'Ambrosio, Fremont; Minh Ngoc Tran, San Jose, both of CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/472,599

(22) Filed: Dec. 27, 1999

(51) Int. Cl.[7] .................................................. B64G 1/24
(52) U.S. Cl. ........................ 244/164; 244/166; 244/171; 701/13
(58) Field of Search ................................ 244/166, 164, 244/176, 171; 701/13

(56) References Cited

U.S. PATENT DOCUMENTS

| | | | |
|---|---|---|---|
| 4,071,211 A | 1/1978 | Muhlfelder et al. | 244/165 |
| 4,230,294 A | 10/1980 | Pistiner | 244/170 |
| 4,521,855 A | 6/1985 | Lehner et al. | 364/434 |
| 5,259,577 A | * 11/1993 | Achkar et al. | 244/166 |
| 5,308,024 A | 5/1994 | Stetson, Jr. | 244/165 |
| 5,610,820 A | 3/1997 | Shankar et al. | 364/424.023 |
| 5,765,780 A | 6/1998 | Barskey et al. | 244/165 |
| 5,787,368 A | 7/1998 | Gamble et al. | 701/13 |
| 5,788,188 A | 8/1998 | Damilano | 244/165 |
| 5,788,189 A | * 8/1998 | Iida | 244/166 |
| 5,957,410 A | * 9/1999 | Bruederle et al. | 244/166 |
| 6,089,509 A | * 7/2000 | Basuthakur et al. | 244/166 |
| 6,113,034 A | * 9/2000 | Basuthakur et al. | 244/166 |

* cited by examiner

Primary Examiner—J. Woodrow Eldred
(74) Attorney, Agent, or Firm—Swidler Berlin Shereff Friedman, LLP

(57) ABSTRACT

An attitude control system uses a first order partial derivative of an error signal, representing a difference between a commanded pitch attitude and a sensed, actual pitch attitude. The first order partial derivative forms a cross product with the Earth's magnetic field to provide a X axis torque rod dipole command, which powers the torque rod in a way that causes a satellite to move toward its commanded attitude.

10 Claims, 6 Drawing Sheets

SATELLITE ATTITUDE CONTROL SYSTEM

BACKGROUND OF THE INVENTION

The present invention relates generally to satellite attitude control and, more specifically, to satellite attitude control methods and apparatuses that control the satellite without imparting any significant in-track orbital disturbances. The invention effects attitude control by using electromagnets and thrusters in combination to control the orientation of low earth orbit satellites with respect to their pitch, roll and yaw axes.

DESCRIPTION OF THE RELATED ART

Control of the attitude of a spacecraft, such as a satellite, is necessary so that the antennas, which often have narrow beams, are pointed correctly at Earth. A number of factors tend to cause the spacecraft to deviate from the desired rotational orientation, including atmospheric drag, which is the dominant source of error for Low-Earth Orbiting (LEO) satellites. Solar pressure acting on the antennas, spacecraft body, and solar sails may also create rotational forces. Earth's magnetic field can produce forces on the satellite if it has elements which are magnetic. Because the satellite moves around Earth's center in its orbit, the forces described above may vary cyclically through the orbit period, and perhaps over a twenty-four hour period. All of these sources of disturbance torque must be actively counteracted by the on-board control system.

In a three axis stabilized satellite, gas jets or "thrusters" are typically used to position the satellite with respect to the pitch, roll and yaw axes. On some satellites, one pair of thrusters is needed for each axis to provide rotation in the pitch, roll, and yaw directions, while velocity increments can be provided by using one thruster to act on a given axis.

FIG. 1 shows the reference Cartesian axes $X_R$, $Y_R$, $Z_R$) with a satellite 10 at the origin. The $Z_R$ axis is directed toward the center of Earth and is in the plane of the satellite orbit. It is aligned along the local vertical of the sub-satellite point. The $X_R$ axis is tangent to the orbital path and lies in the orbital plane. The $Y_R$ axis is perpendicular to the orbital plane. "Roll" is defined as rotation about the $X_R$ axis ($\phi$); "pitch" is rotation about the $Y_R$ axis ($\theta$), and "yaw" is rotation about the $Z_R$ axis ($\psi$).

The satellite 10 must be stabilized with respect to the reference axes to maintain accurate pointing of its antenna beams. The axes $X_R$, $Y_R$, and $Z_R$ are defined with respect to the location of the satellite 10, while the second set of Cartesian axes shown in the FIG. 1, X, Y, and Z, define the orientation of the satellite. Changes in satellite attitude cause the angles $\phi$, $\theta$, and $\psi$ to vary as the X, Y, and Z axes move relative to the fixed reference axes $X_R$, $Y_R$, and $Z_R$. The Z axis is usually directed toward a reference point on Earth, called the Z-axis intercept. The location of the Z-axis intercept defines the pointing of the satellite antennas. The Z-axis intercept point may be moved to re-point all the antenna beams by changing the attitude of the satellite with an attitude control system.

There are several ways to make a spacecraft or satellite stable when it is in orbit. For satellites known as "spinners," the entire body of the satellite is rotated at 30–100 rpms to provide a gyroscopic action, which in turn maintains the spin axis in the same direction. In another attitude control method, three or more "momentum wheels" are mounted on the spacecraft body in order to provide a direct source of control torque. Each momentum wheel consists of a solid disk driven by a motor to rotate at high speed within a sealed, evacuated housing. When control torque is necessary to correct the satellite attitude, the opposite torque is applied to the momentum wheel assembly. With three momentum wheels, rotation of the satellite about each axis can be commanded from Earth by increasing or decreasing the appropriate momentum wheel speed. Since external torque disturbances will tend to cause the speed of the momentum wheels to increase over time, this method requires the use of another source of torque such as thrusters or magnetic torque rods in order to keep the momentum wheels from an overspeed condition.

A momentum bias attitude control system employing a single momentum wheel may include infrared sensors on the spacecraft that are aimed at a reference, such as the outer edge of Earth's disk, to provide a reference attitude. The reference attitude is compared to a desired attitude. Any error signal generated by this comparison is processed to derive control signals for the motors that drive the momentum wheel for pitch control, and magnetic torque rods for roll and yaw control. Such systems are generally limited in their ability to maneuver about the roll and yaw axes.

Magnetic "torque rods," in the form of elongated electromagnets, have long been used as part of the momentum management systems of momentum bias controllers for satellites, but only to dampen the wobble generated by the rotating momentum wheels.

One significant advantage of a momentum bias attitude control system is that the combination of torque rods and momentum wheels for control does not impart disturbances to the satellite orbit motion as would thrusters. One disadvantage is that since such wheels must be kept spinning throughout the life of the satellite, they must be designed very carefully and conservatively in order to avoid reliability problems. In the event of a momentum wheel failure, satellites would have to use their thrusters to make attitude adjustments. However, this would be undesirable due to the rapid consumption, and eventual premature exhaustion of propellant as well as undesirable disturbances to the satellite orbital motion.

Examples of attitude control systems can be found in several United States patents. In U.S. Pat. No. 4,521,855 to Lehner et al., a system is disclosed that estimates yaw error, and roll and yaw disturbance torques from measured roll error and yaw momentum on a continuous on-orbit basis. the information can be used to continuously correct for yaw error by activating a "magnetic torquer." Two control loops are employed. In a "fast" loop, nutations are damped by changing momentum wheel speed, while in a "slow" loop, yaw error corrections are made by adjusting current to the magnetic torquer.

U.S. Pat. No. 5,308,024 to Stetson describes a satellite attitude control system that employs pitch, roll, and yaw momentum wheels. The system provides attitude control in the event of a loss of the inertial yaw attitude reference, based on modeling of the roll-yaw rigid body dynamics and the roll-yaw orbit kinematics. This system is of particular use when the Earth sensor assembly (ESA), which normally provides yaw reference, fails. U.S. Pat. No. 5,610,820 to Shankar et al. describes a zero momentum attitude control system in which the torque required about a control axis to maintain the desired attitude is determined, and then the thrusters and magnetic torquers are activated to maintain the desired attitude.

A continuing need exists for improved attitude control systems that can effect attitude control without use of momentum wheels or other moving parts, and in particular, for low Earth orbit satellites in a polar orbit. Systems which improve propellant consumption efficiency are also in need.

SUMMARY OF THE INVENTION

An object of the present invention is to provide a method and apparatus for controlling the attitude of a satellite or other spacecraft without imparting any significant in-track orbital disturbances.

Another object of the present invention is to provide a satellite attitude control method and apparatus which provide improved propellant consumption performance.

Still another object of the present invention is to provide a satellite attitude control method and apparatus in which no spinning parts are required to control the satellite pitch attitude.

These objectives are met by providing a method of controlling attitude of a satellite which includes the steps of determining whether the measured pitch attitude deviates from a commanded pitch attitude, and powering a torque rod in proportion to the pitch attitude deviation, and in conjunction with Earth's measured or predicted magnetic field, to produce a magnetic dipole moment which tends to correct the satellite's attitude.

A separate, simultaneously operating control includes the steps of determining whether the measured roll and yaw attitude rates (time derivative of the roll and yaw attitude measurements, respectively) deviates from the commanded equivalents, and powering a separate torque rod in proportion to the rate error. Again, the magnetic dipole moment generated by the torque rod interacts with the Earth's magnetic field to generate a correcting torque on the satellite.

Both of these controllers operate in conjunction with thruster-actuated control methods. The cyclical nature of Earth's magnetic field makes the availability of control torque in a given direction also vary cyclically. In order to make certain that the satellite remains in control even when external disturbances overpower the torque rods, thruster activity remains an optional control method.

Other objects and features of the invention will become more apparent from the following detailed description when taken in conjunction with the illustrative embodiments in the accompanying drawings.

DETAILED DESCRIPTION OF THE PREFERRED EMBODIMENTS

Figure 1:
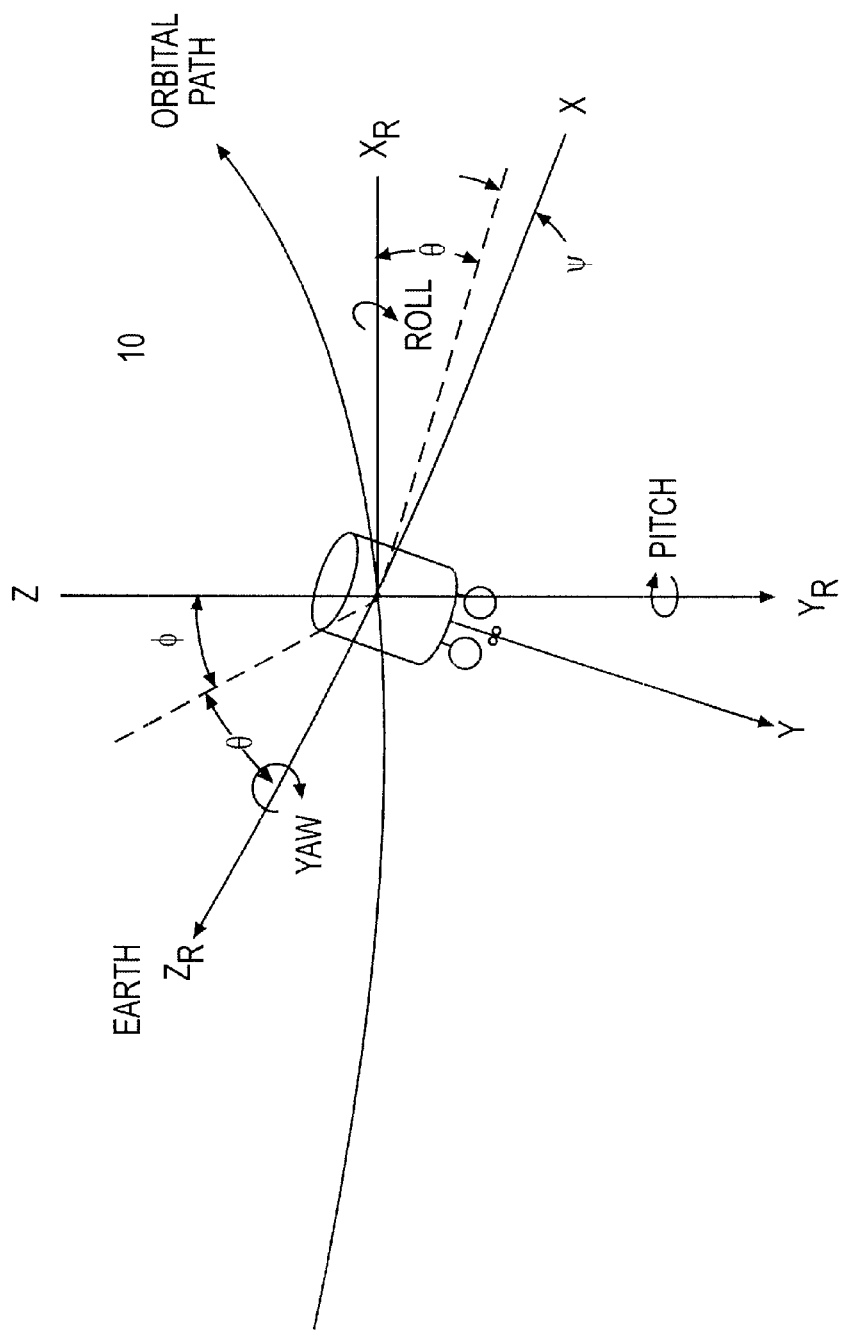
FIG. 1 is a schematic view showing orientation of a satellite in space, with its axes of pitch, roll, and yaw and its reference axes.
Figure 2:
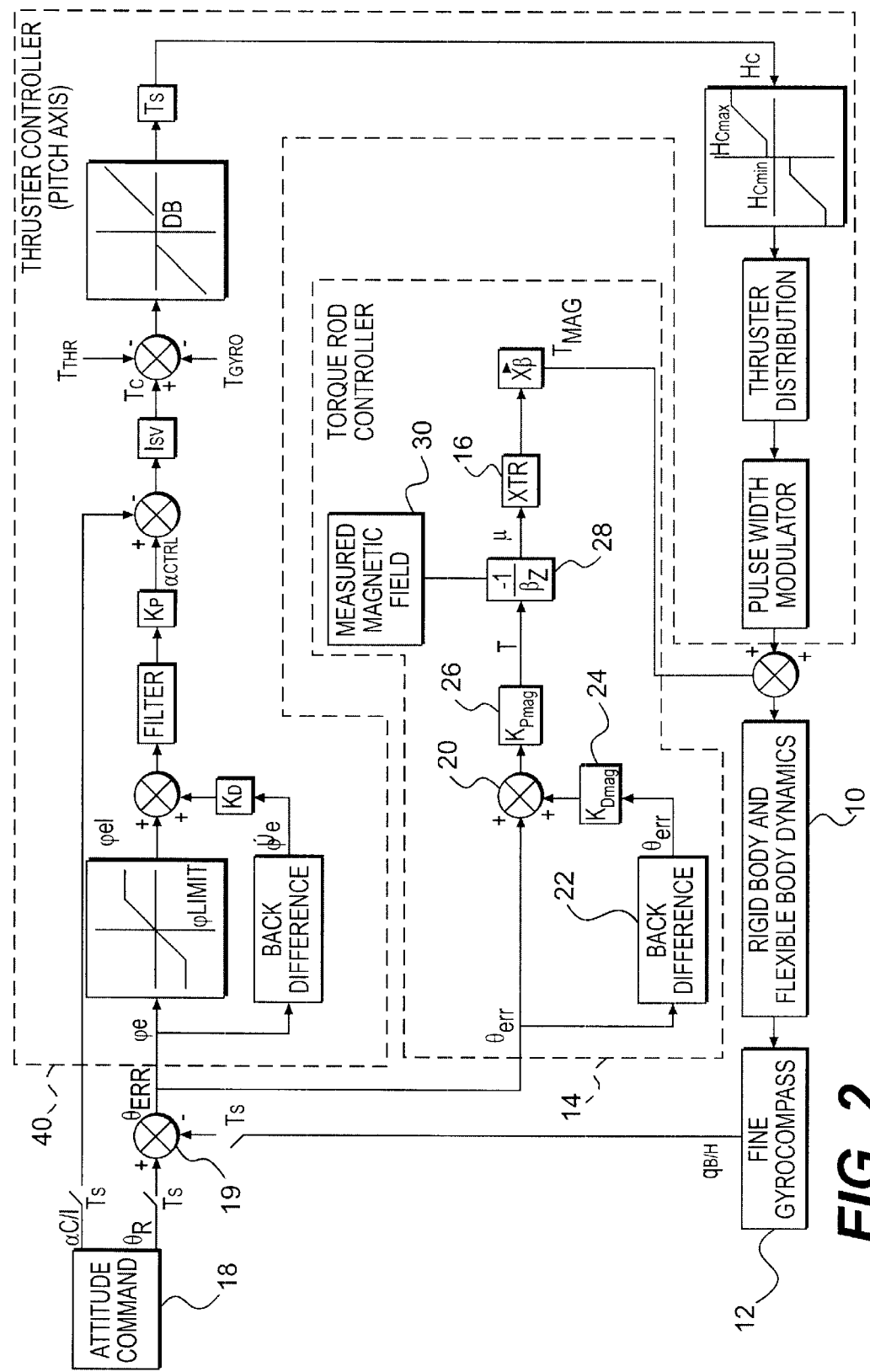
FIGS. 2 and 3 are schematic views of a complete satellite attitude control system which includes a preferred embodiment of the present invention.

Referring to FIG. 2, an attitude control system for a spacecraft or satellite 10 is shown schematically in block diagram form, and includes a pitch attitude sensor (SI) 12 (which could be a fine gyrocompass or other suitable device), a control program 14, executable by an on-board computer, and an X-axis torque rod (XTR) 16. The control program 14 can be implemented entirely in software, or alternatively, could be partially or fully implemented in one or more application specific integrated circuit (ASIC) chips. The same functions could be performed using analog circuitry as well.

A commanded pitch attitude $\theta_R$ is set at block 18 by ground controllers or could be pre-programmed, and is supplied to an adder block 19. The other input to the adder block 19 is the estimated pitch attitude sensed by the attitude sensor 12. The adder block 18 functions to provide an error signal, $\theta_{ERR}$, when the estimated pitch attitude is different from the commanded pitch attitude.

The error signal $\theta_{ERR}$ and the first order derivative of the error signal $\theta'_{ERR}$ are supplied to a second adder block 20. The first order derivative, which represents the rate of change in the error signal, can be determined by any of a variety of known mathematical techniques. One preferred method is to calculate the back difference using the equation z−1/TsZ, where Ts is the sampling period and Z is a Z transform representation.

The back difference calculation is shown in block 22 as part of a proportional derivative loop, which also includes a block 24 which represents a derivative control gain, $K_{DMAG}$. $K_{DMAG}$ is a constant, the value of which is chosen to determine the influence of the rate of change of the error $\theta_{ERR}$ on the applied torque. The output of the second adder 20 is combined with a proportional gain $K_{PMAG}$ at block 26. $K_{PMAG}$ is a constant that affects the value of torque applied for a given output from adder 20. Both $K_{DMAG}$ and $K_{PMAG}$ act as amplifiers.

The output "T" is fed to a block 28. A value of the measured or estimated magnetic field of the Earth is provided by block 30. Block 30 converts the measured magnetic field into a vector representing the Z component of the magnetic field vector in the body frame of the satellite 11. This vector is multiplied by the scalar value T to provide a cross product, $\mu$, which represents the X torque rod dipole command signal, which is supplied to the X torque rod 16. The torque rod 16 creates a magnetic dipole moment which tends to move the satellite 11 towards a corrected attitude position, which is then sensed by the attitude sensor 12.

Figure 4:
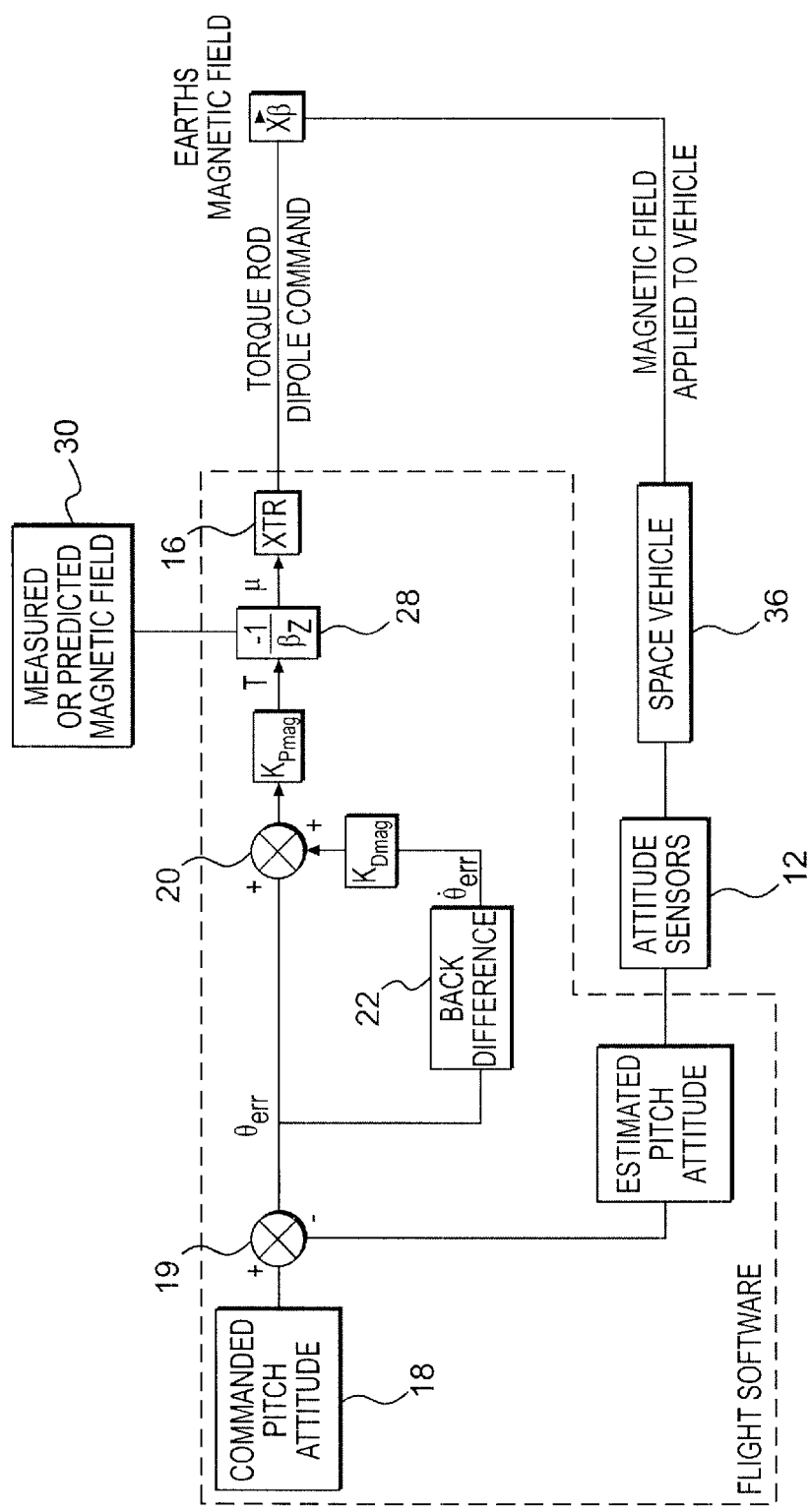
FIGS. 4 and 5 are isolated schematic view of the satellite attitude control system which is the primary subject of this paper, according to another embodiment of the present invention, which is to be used complementary to the attitude control systems of FIGS. 2 and 3.

While the feedback loop runs to provide magnetic dipole moments, a separate control loop 40 is run to cause the thrusters to fire and maintain attitude. The two loops (14 and 40) run in parallel, with the magnetic dipole loop tending to diminish the requirements of the thrusters by maintaining an attitude more closely on the commanded pitch attitude. The details of control loop 40 are not unique by themselves, but are considered so in conjunction with the other aspects of the invention. Components of the loop are shown in a representative form known to those skilled in the art. FIG. 4 provides a simplified look at the magnetic portion of FIG. 2. The numbering and definitions are identical to FIG. 2.

Figure 3:
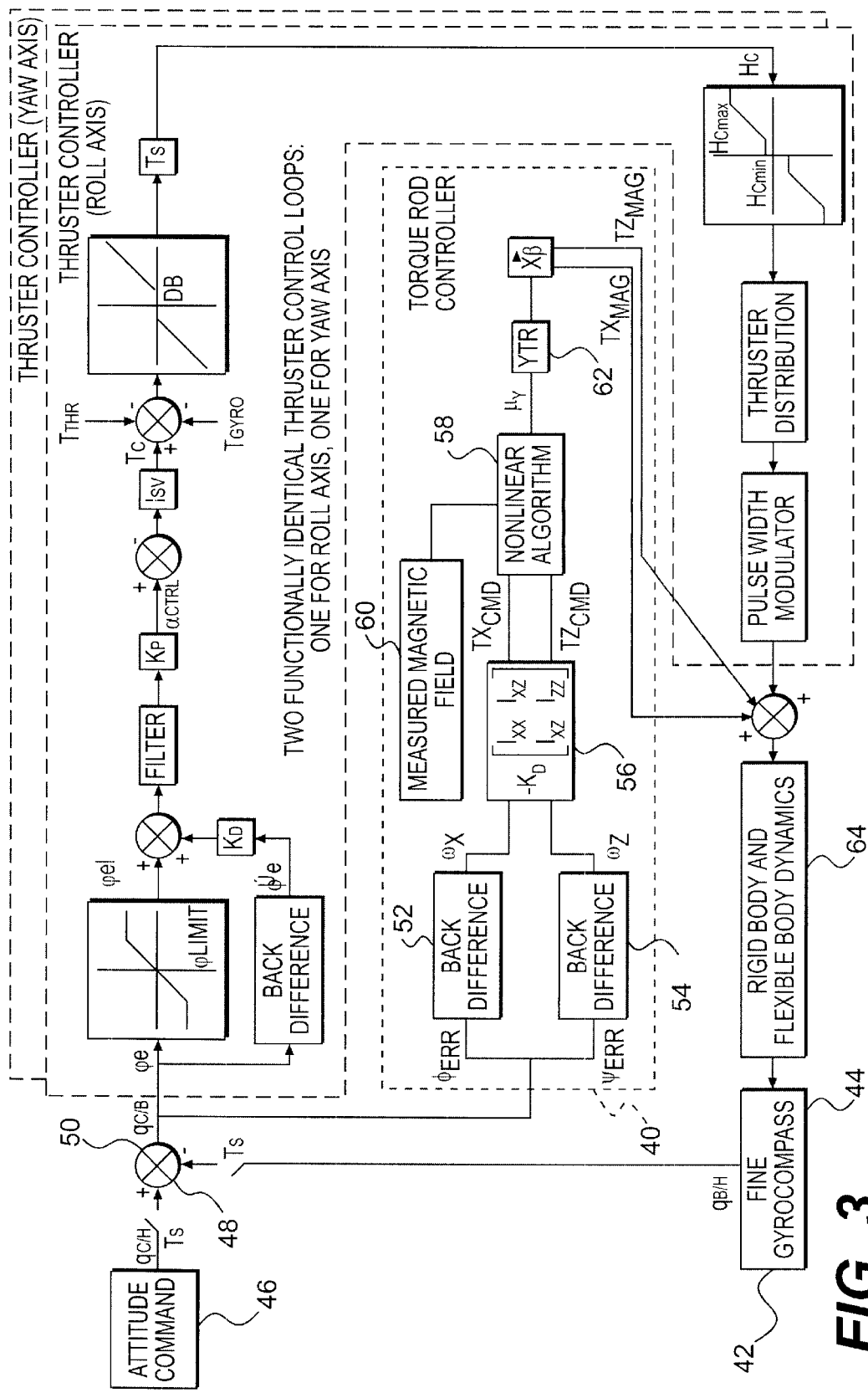
Figure 5:
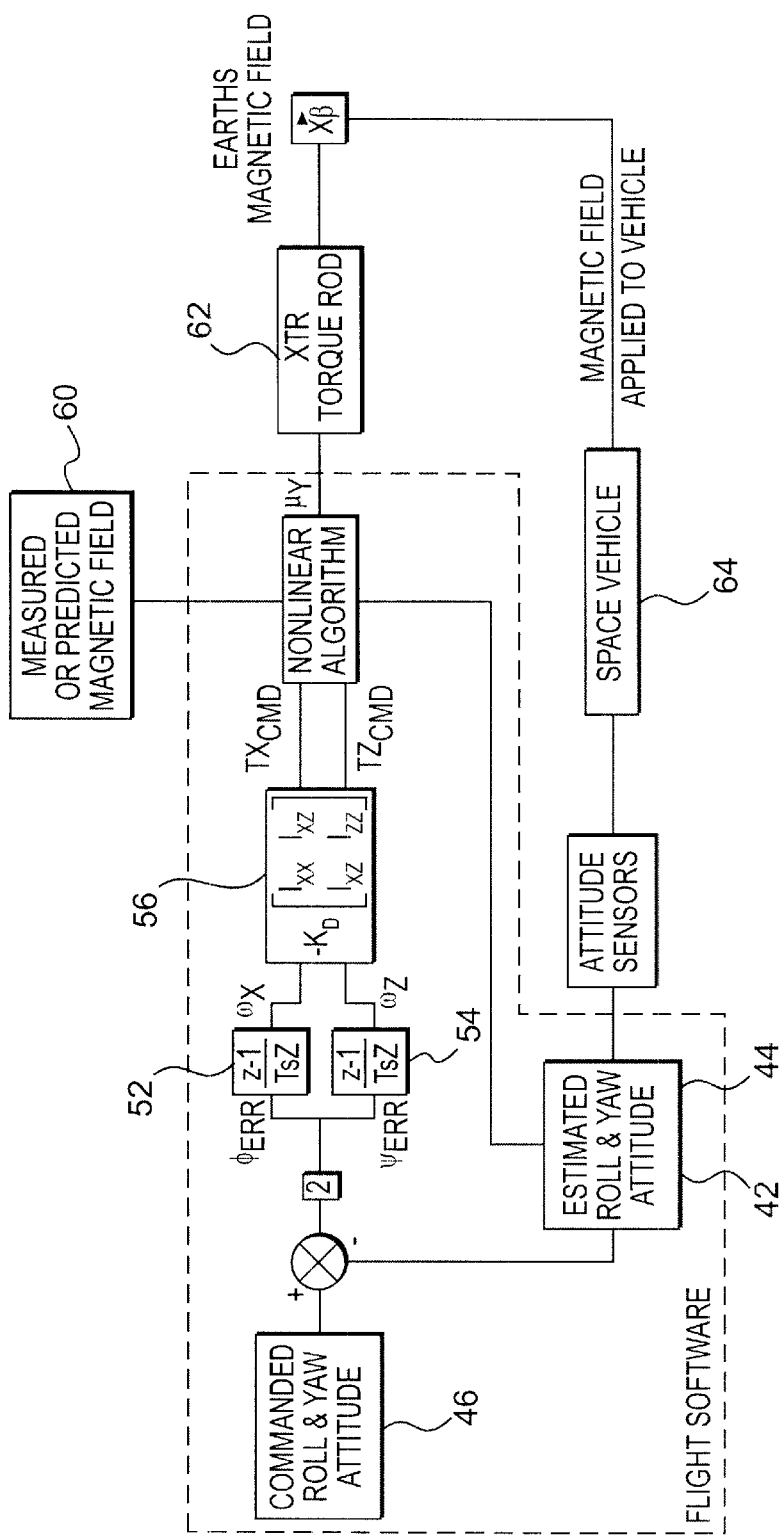

The same principles described above can be used to effect yaw and roll control. Referring to FIG. 3 (and FIG. 5), an attitude control system 40 for controlling yaw and roll attitude includes a roll attitude sensor 42 and a yaw attitude sensor 44, respectively outputting signals indicative of estimated roll and yaw attitude. These signals are fed to an attitude control program 46 where they are respectively combined with a commanded roll attitude and a commanded yaw attitude at adder blocks 48 and 50. Resulting roll and yaw error signals, $\phi_{ERR}$ and $\psi_{ERR}$, respectively, are supplied to blocks to provide first order partial derivatives of each. Again, one preferred way to do this is to use the back difference calculation, using back difference blocks 52 and 54. The output of each of these blocks is the roll rate, $\omega_X$, and the yaw rate, $\omega_Y$. Block 56 combines these values to produce a commanded roll torque $Tx_{CMD}$ and a commanded yaw torque $Tz_{CMD}$.

At this point the commanded torque values are fed to a non-linear algorithm 58, which takes these values and combines them with the Earth's magnetic field, supplied by sensor (S5) 60. Non-linear algorithm 58 functions as a rate damping device, and outputs a Y torque rod dipole command, $\mu_Y$, which is a cross product between the commanded torque and the Earth's magnetic field. This signal is supplied to the Y torque rod 62, which in turn causes the satellite 64 to move towards its commanded roll and yaw.

The "nonlinear algorithm" (58) includes the following elements, which have been implemented in flight software.

Figure 6:
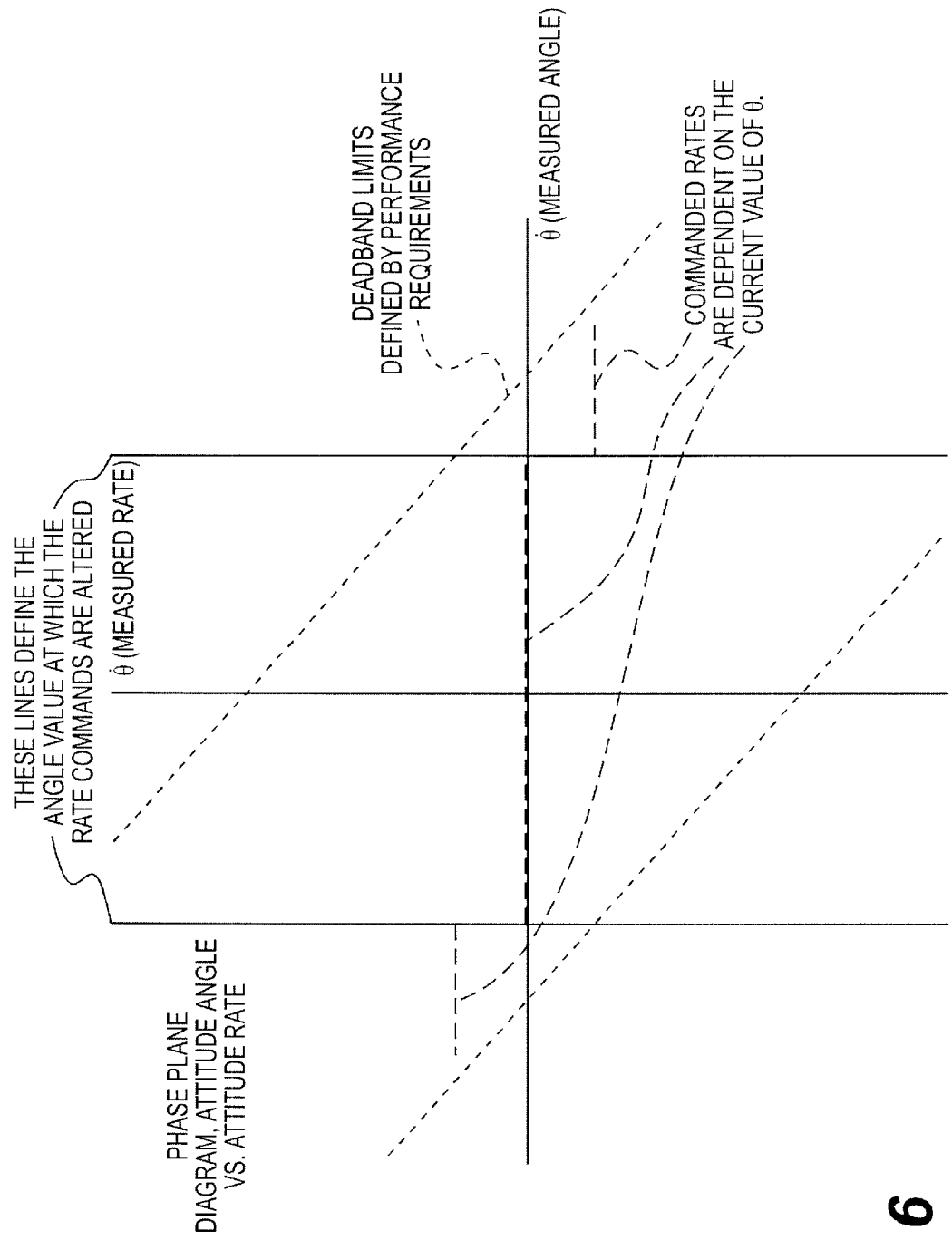
FIG. 6 is a schematic view of the control system's non-linear algorithm, with explanations of how it operates.

1. The XTR command (FIG. 2, 16) will in general create a yaw torque as well as the desired pitch torque. This torque can be estimated by the cross product of the XTR command with the magnetic field vector. The resulting yaw torque value, Tz_XTR, must be included in the development of the YTR command.
2. A commanded rate value is computed individually for the roll and yaw axes. FIG. 6 shows a phase plane representation of the roll (or yaw) motion.

When the attitude angle is outside the solid vertical lines (actually database values), the rate command is nonzero. This tends to send the vehicle in the correct direction (e.g., when the attitude angle is positive and beyond the limits, the commanded rate is negative. When the attitude angle is negative, the commanded rate is positive.) When the attitude angles are between the solid vertical lines, the commanded rate is zero, and so the system is a pure rate damper. Note that if the attitude angle/rate combination exceeds the deadband limits (diagonal dashed lines), then a thruster pulse will be commanded.

3. The roll rate error is computed from the sum of the roll rate command and the roll error rate. Yaw rate error is computed similarly.
4. The Roll torque command (Tx) and Yaw torque command are computed as follows, where Ixx and Izz are the roll and yaw moments of inertia of the vehicle (estimated values), and Ixz is the roll/yaw product of inertia.

$Tx=Ixx*$(roll rate error)$+Ixz*$(yaw rate error)

$Tz=Ixz*$(roll rate error)$+Izz*$(yaw rate error)

5. The actual correction torque for the yaw axis is the difference between Tz and Tz_XTR. The roll axis correction torque is Tx.
6. Determine the YTR command by the following algorithm, where Bx and Bz are the X and Z components of the magnetic field, respectively:

$X \text{ correction}=Tx*Bx/\sqrt{Bx^2+Bz^2}$ $Z \text{ correction}=(Tz-Tz\_XTR)*(-Bz/\sqrt{Bx^2+Bz^2})$ $YTR \text{ command}=(X \text{ correction}+Z \text{ correction})/\sqrt{Bx^2+Bz^2}$ It is expected, or anticipated, that the present invention will result in a decrease in the propellant consumption of a LEO spacecraft by about 90% when the magnetic torque rods are selected so as to be strong enough to counteract the pitch and roll/yaw disturbance torque. This has the obvious advantage of increasing the useful life of the LEO spacecraft, thus reducing the overall cost of owning and/or operating such a spacecraft.

Although the invention has been described with reference to several particular embodiments, it will be understood to those skilled in the art that the invention is capable of a variety of alternative embodiments within the spirit and scope of the appended claims.

What is claimed is:

1. An attitude control system for effecting pitch control of a satellite, comprising:
    means for determining a first order partial derivative of an error value, the error value being a difference between a commanded pitch value and an estimated actual pitch value;
    means for producing a cross product between the first order partial derivative and a magnetic field vector of the Earth, thereby providing a torque rod dipole command;
    an X axis torque rod powered according to the torque rod dipole command; and
    a pitch attitude sensor providing feedback to the determining means as to the estimated actual pitch value.

2. An attitude control system according to claim 1, wherein the determining means includes means for determining the back difference of the error value.

3. An attitude control system according to claim 1, further comprising a sensor for sensing the Earth's magnetic field, and means for determining the Z component of the Earth's magnetic field in a body frame of the satellite.

4. An attitude control system according to claim 1, wherein the attitude control system runs in parallel to a thruster control system.

5. An attitude control system for effecting yaw and roll control of a satellite, comprising:
    means for determining a first order partial derivative of a first error value, the first error value being a difference between a commanded yaw value and an estimated actual yaw value, and corresponding to a roll moment of inertia;
    means for determining a first order partial derivative of a second error value, the second error value being a difference between a commanded roll value and an estimated actual roll value, and corresponding to a yaw moment of inertia;
    means for determining commanded roll torque and commanded yaw torque from the roll moment of inertia and the yaw moment of inertia;
    means for producing a cross product between the commanded roll torque, the commanded yaw torque, and a magnetic field vector of the Earth, thereby providing a Y torque rod dipole command;
    a Y axis torque rod powered according to the Y torque rod dipole command; and
    a roll axis and yaw axis sensor providing feedback to the means for producing the first order partial derivatives.

6. A method of directly controlling attitude of a satellite having first and second torque rods, comprising the steps of:
    determining whether a measured pitch attitude deviates from a commanded pitch attitude; and
    powering the first torque rod in proportion to the pitch attitude deviation, and in conjunction with Earth's magnetic field, to produce a magnetic dipole moment which tends to correct the satellite's orbit without utilizing spinning parts.

7. The method claim 6, further comprising determining whether measured roll and yaw attitude rates deviate from commanded equivalents, and powering the second torque rod in proportion to the rate error, wherein the magnetic dipole moment generated by the second torque rod interacts with Earth's magnetic field to generate a correcting torque on the satellite.

8. The method of claim 7, wherein the step of determining whether measured roll and yaw rates deviate from commanded equivalents comprises determining the time derivative of the roll and yaw attitude measurements, respectively.

9. The method of claim 6, wherein Earth's magnetic field is measured.

10. The method of claim 6, wherein Earth's magnetic field is estimated.

* * * * *